United States Patent
Yu et al.

(10) Patent No.: US 6,944,783 B2
(45) Date of Patent: Sep. 13, 2005

(54) POWER CONTROLLER AND ASSOCIATED MULTI-PROCESSOR TYPE SUPPORTING COMPUTER SYSTEM

(75) Inventors: Chia-Hsing Yu, Taipei Hsien (TW); Nai-Shung Chang, Taipei Hsien (TW)

(73) Assignee: Via Technologies, Inc., Taipei Hsien (TW)

(*) Notice: Subject to any disclaimer, the term of this patent is extended or adjusted under 35 U.S.C. 154(b) by 661 days.

(21) Appl. No.: 10/037,896

(22) Filed: Oct. 22, 2001

(65) Prior Publication Data

US 2002/0188874 A1 Dec. 12, 2002

(30) Foreign Application Priority Data

Jun. 8, 2001 (TW) .......................................... 90113919 A

(51) Int. Cl.⁷ ................................................. G06F 1/26
(52) U.S. Cl. ...................................................... 713/340
(58) Field of Search ............................ 713/340; 712/26, 712/232, 15

(56) References Cited

U.S. PATENT DOCUMENTS 5,886,640 A * 3/1999 Wang et al. ................ 340/635
2002/0162040 A1 * 10/2002 Zhang ......................... 713/340

* cited by examiner

Primary Examiner—Meng-Al T. An
Assistant Examiner—Nirav Amin
(74) Attorney, Agent, or Firm—J.C. Patents

(57) ABSTRACT

A power controller for a computer system capable of supporting multiple processor types. The power controller receives a voltage identification signal from the microprocessor and a microprocessor selection signal from a motherboard to provide a correct voltage specification signal and terminal voltage to the microprocessor. The invention also provides voltage specification signals and terminal voltages to the motherboard of a computer system that can support a multiple of processor types.

10 Claims, 4 Drawing Sheets

US 6,944,783 B2

POWER CONTROLLER AND ASSOCIATED MULTI-PROCESSOR TYPE SUPPORTING COMPUTER SYSTEM

CROSS-REFERENCE TO RELATED APPLICATION

This application claims the priority benefit of Taiwan application Serial No. 90113919, filed Jun. 8, 2001.

BACKGROUND OF THE INVENTION

1. Field of Invention

The present invention relates to a power controller and an associated computer system. More particularly, the present invention relates to a power controller and an associated multi-processor type supporting computer system.

2. Description of Related Art

In general, a motherboard manufacturer needs to produce a dedicated motherboard for each type of microprocessor. This is because voltage requirements are usually different for different types of microprocessors. Consequently, a universal motherboard for all microprocessors is currently unavailable. For example, Intel's Coppermine CPU uses a voltage riser module 8.4 (VRM 8.4) while Intel's Tualatin CPU uses a voltage riser module 8.5 (VRM 8.5). In the meantime, each microprocessor uses a different terminal voltage ($V_{TT}$). The Coppermine CPU uses a terminal voltage 1.5V while the Tualatin CPU uses a terminal voltage 1.25V. Due to the differences, motherboard manufacturers have to design voltage controllers and motherboards that reflect each particular microprocessor design.

SUMMARY OF THE INVENTION

Accordingly, one object of the present invention is to provide a power controller capable of receiving a voltage identification (VID) signal and a microprocessor selection signal. Hence, the correct voltage specification and terminal voltage are provided to a particular microprocessor in a computer system. In other words, the computer system has multi-processor type supporting capacity.

To achieve these and other advantages and in accordance with the purpose of the invention, as embodied and broadly described herein, the invention provides a power controller. The power controller includes a first voltage identification digital/analogue converter, a second voltage identification digital/analogue converter and a selector. The first voltage identification digital/analogue converter receives a voltage identification signal and outputs a first voltage specification signal. The second voltage identification digital/analogue converter receives the voltage identification signal and outputs a second voltage specification signal. The selector couples with the first voltage identification digital/analogue converter and the second voltage identification digital/analogue converter and outputs either the first voltage specification signal or the second voltage specification signal according to a microprocessor selection signal.

This invention also provides an alternative power controller. The power controller includes a plurality of voltage identification digital/analogue converters and a selector. The voltage identification digital/analogue converters receive a voltage identification signal from a specified microprocessor and output a plurality of voltage specification signals. The selector couples with each voltage identification digital/analogue converter and outputs one of the voltage specification signals according to a microprocessor selection signal and a microprocessor type signal. Each voltage identification digital/analogue converter corresponds with one type of microprocessor for generating a voltage specification signal suitable for the particular microprocessor.

This invention also provides a multi-processor type supporting computer system. The computer system includes a microprocessor socket for holding a microprocessor and a power controller that couples to the microprocessor socket. The power controller receives a voltage identification signal from the microprocessor and a microprocessor selection signal from the computer system such that the computer system is able to provide a core voltage to the microprocessor. The power controller determines the core voltage according to the microprocessor selection signal. If the microprocessor belongs to a first type, the power controller outputs a first voltage identification signal and a first terminal voltage. On the other hand, if the microprocessor belongs to a second type, the power controller outputs a second voltage specification signal and a second terminal voltage.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
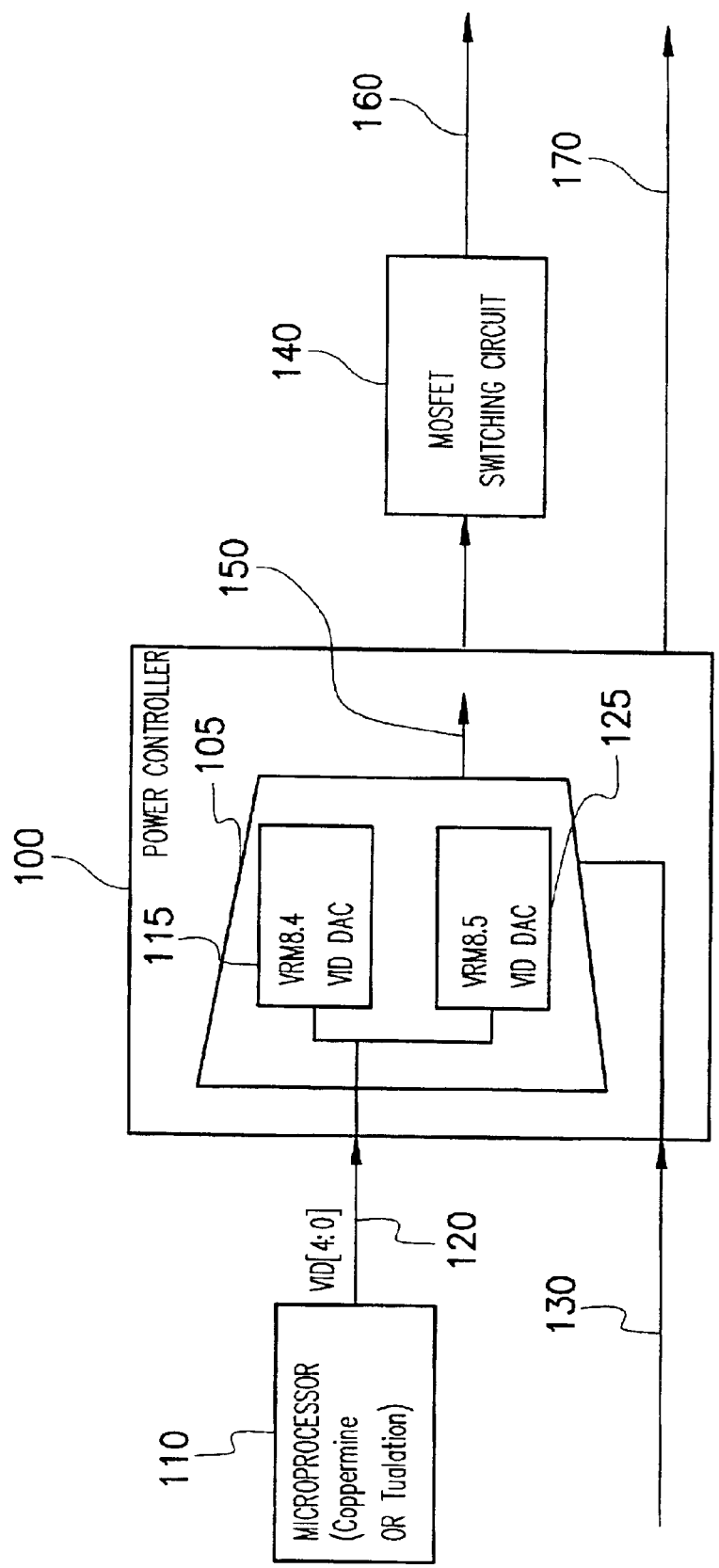
FIG. 1 is a sketch of a power controller suitable for operating a Coppermine or Tualatin microprocessor inside socket 370 according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a sketch of a power controller suitable for operating a Coppermine or Tualatin microprocessor inside socket 370 according to a first preferred embodiment of this invention. As shown in FIG. 1, a power controller 100 receives a voltage identification (VID[4:0]) signal 120 from a microprocessor (such as a Coppermine microprocessor or a Tualatin microprocessor) 110. A VRM 8.4 voltage identification digital/analogue converter 115 and a VRM 8.5 voltage identification digital/analogue converter 125 inside the power controller 100 pick up the voltage identification signal 120 and output a voltage specification signal that satisfies the Coppermine microprocessor or Tualatin microprocessor according to the voltage identification signal. In addition, a selector 150 outputs a correct voltage specification signal 150 according to a microprocessor selection signal 130 provided by the motherboard. Hence, the voltage specification signal 150 is able to meet VRM 8.4 or VRM. 8.5 specification. The power controller 100 utilizes the voltage specification signal 150 to control a MOSFET switching circuit 140. Ultimately, the MOSFET switching circuit 140 is able to output a correct core voltage 160 to a central processor (a core voltage according to VRM 8.4 specification of Intel's Coppermine processor or a core voltage according to VRM 8.5 specification of Intel's Tualatin processor). Furthermore, the power controller 100 is able to output correct terminal voltage ($V_{TT}$) 170 (1.5V for Intel's Coppermine processor and 1.25V for Intel's Tualatin processor) to the microprocessor 110 according to the microprocessor selection signal 130.

As shown in FIG. 1, the power controller 100 includes at least a VRM 8.4 voltage identification digital/analogue converter 115 and a VRM 8.5 voltage identification digital/analogue converter 125. The VRM 8.4 voltage identification digital/analogue converter 115 receives the voltage identification signal and outputs a voltage specification signal that meets the demand of a Coppermine processor. Similarly, the VRM 8.5 voltage identification digital/analogue converter 125 receives the voltage identification signal and outputs a voltage specification signal that meets the demand of a Tualatin processor. According to the microprocessor selection signal 130, the power controller 100 determines the type of microprocessor 110 in a microprocessor system. If a Coppermine processor is plugged into the system, the power controller 100 outputs voltage specification signals according to the specification inside the VRM 8.4 voltage identification digital/analogue converter 115 as well as a 1.5V terminal voltage. However, if a Tualatin processor is plugged into the system, the power controller 100 outputs voltage specification signals according to the specification inside the VRM 8.5 voltage identification digital/analogue converter 125 as well as a 1.25V terminal voltage.

Figure 2:
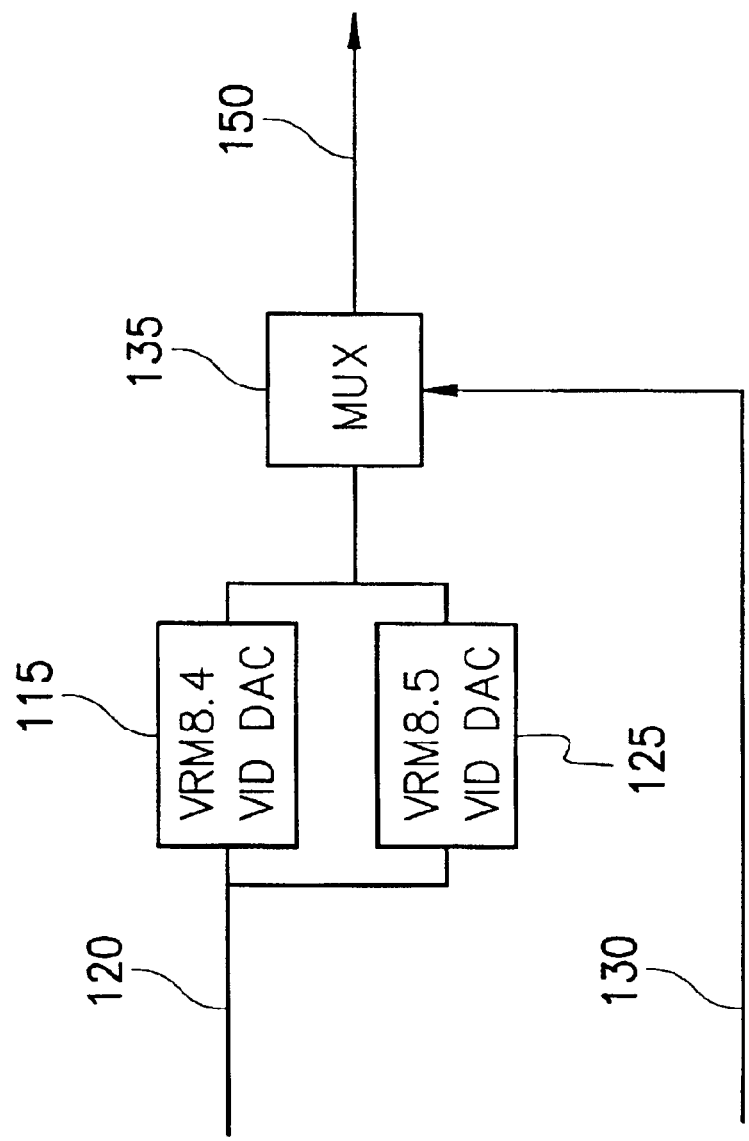
FIG. 2 is a diagram showing in more detail the selector inside the power controller in FIG. 1.

FIG. 2 is a diagram showing in more detail the selector inside the power controller in FIG. 1. As shown in FIG. 2, the selector 105 includes a VRM 8.4 voltage identification digital/analogue converter 115, a VRM 8.5 voltage identification digital/analogue converter 125 and a multiplexer 135. The multiplexer 135 receives the microprocessor selection signal 130 as a control signal and outputs voltage specification signals according to the specification inside the 8.4 voltage identification digital/analogue converter 115 or the specification inside the VRM 8.5 voltage identification digital/analogue converter 125.

Figure 3:
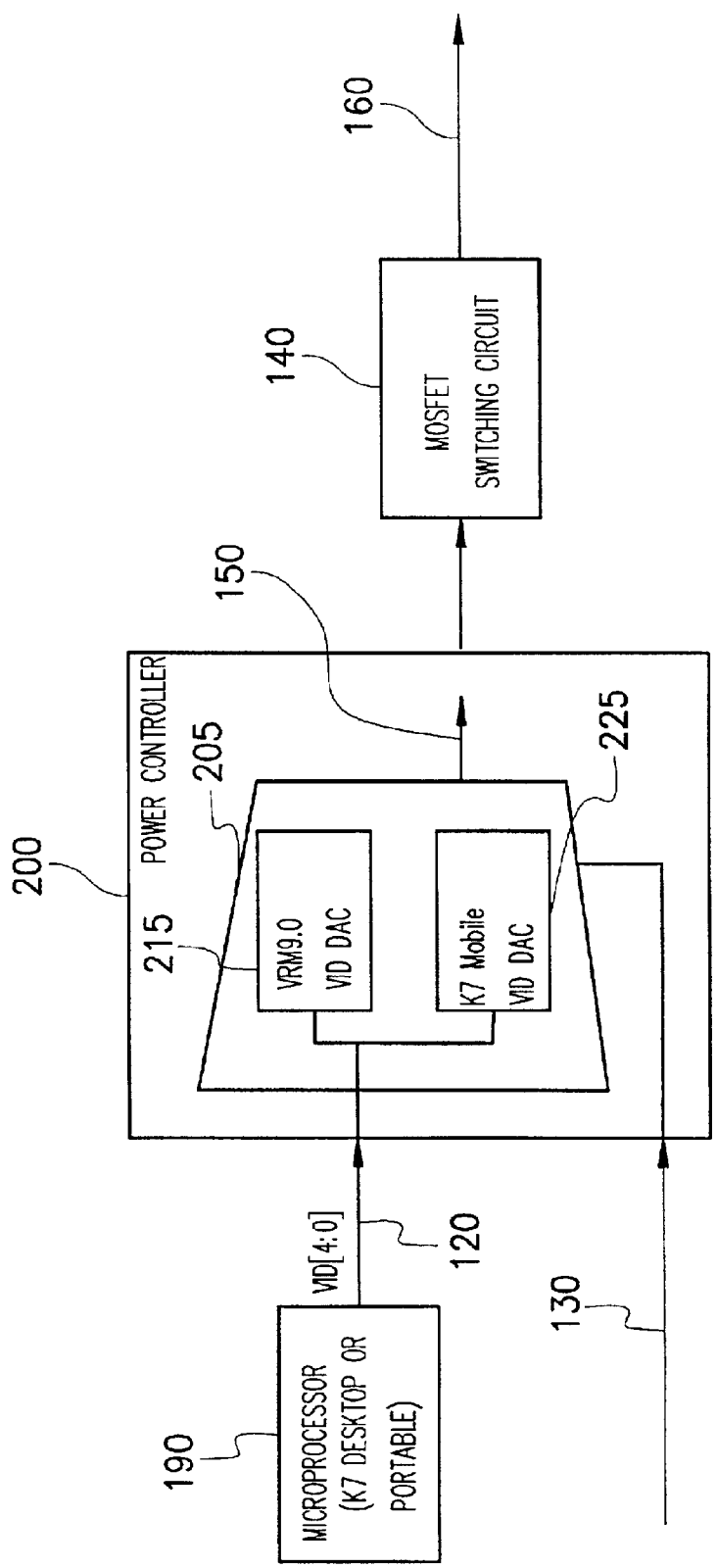
FIG. 3 is a sketch of a power controller suitable for operating a K7 desktop or K7 portable microprocessor inside socket 462 according to a second preferred embodiment of this invention.

FIG. 3 is a sketch of a power controller suitable for operating K7 desktop or K7 portable microprocessor inside socket 462 according to a second preferred embodiment of this invention. As shown in FIG. 3, a power controller 200 receives a voltage identification signal 120 from a microprocessor 190 (a K7 desktop processor or a K7 portable processor). A motherboard (not shown) provides a microprocessor selection signal 130 to the selector 205 inside the power controller 200 to produce a correct voltage specification signal 150. In other words, the voltage specification signal 150 meets the VRM 9.0 specification or the portable K7 specification. According to the voltage specification signal 150, the power controller 200 controls a MOSFET switching circuit 140. Hence, the MOSFET switching circuit can output a correct processor core voltage 160 (the core voltage for an AMD K7 desktop processor is the VRM 9.0 specification and AMD K7 portable processor uses K7 portable specification).

Figure 4:
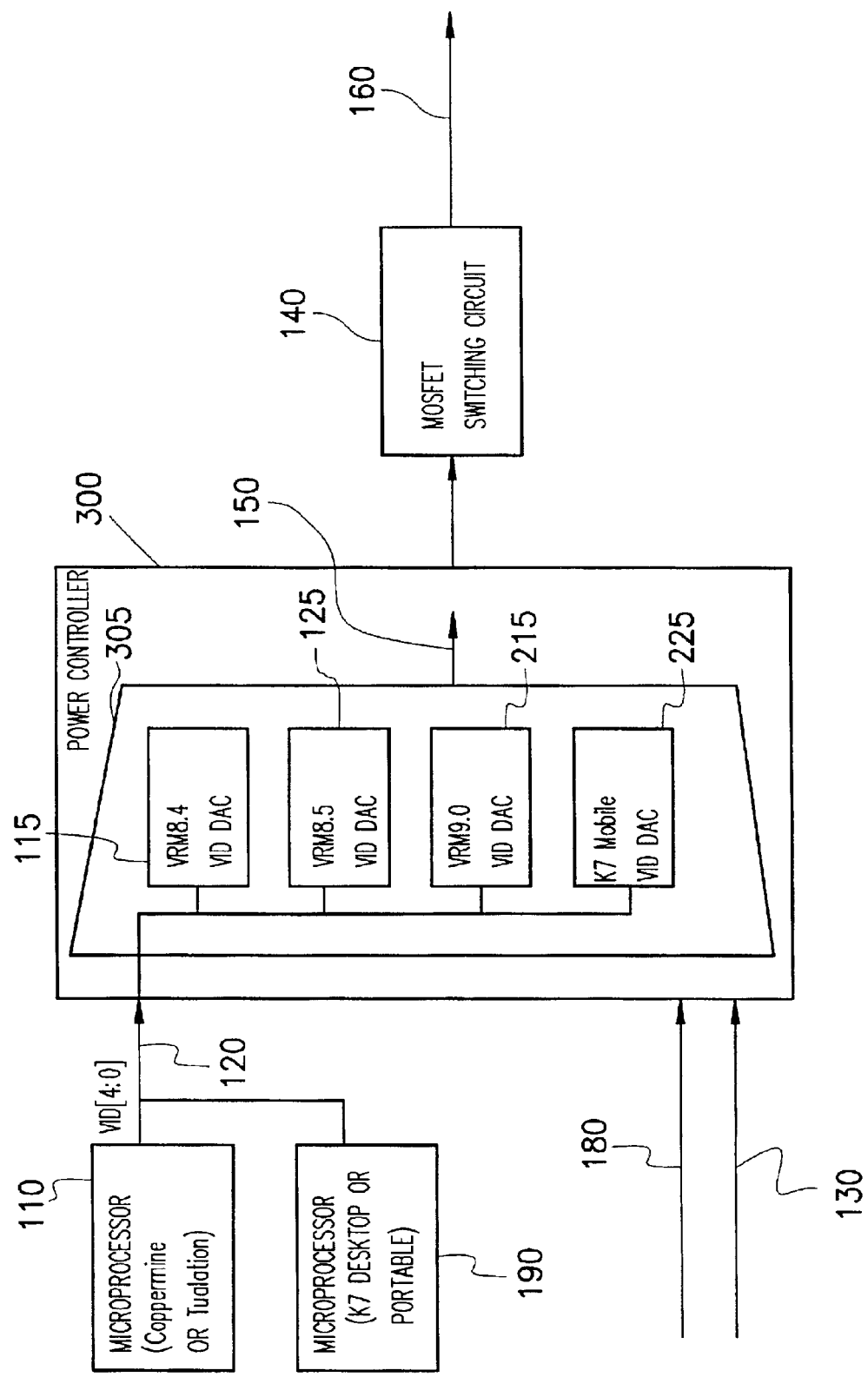
FIG. 4 is a sketch of the motherboard of a computer system capable of supporting a multiple of processor types according to a third preferred embodiment of this invention.

FIG. 4 is a sketch of the motherboard of a computer system capable of supporting a multiple of processor types according to a third preferred embodiment of this invention. As shown in FIG. 4, the computer system is able to support various types of microprocessors. The computer system uses a pair of microprocessor sockets (Socket 370 and Socket 462) for plugging Intel's Coppermine processor, Intel's Tualatin processor, AMD's K7 desktop processor or AMD's K7 portable processor. The microprocessor is plugged into either one of the two sockets. Voltage identification signal terminals on the microprocessor sockets are connected to a power controller 300. Hence, the power controller 300 can receive a voltage identification signal 120 transmitted from a first microprocessor (Intel's Coppermine processor, or Intel's Tualatin processor) 110 or a second microprocessor (AMD's K7 desktop processor or AMD's K7 portable processor) 190. By a combining microprocessor selection signal 130 and a microprocessor type signal 180 from the motherboard, a voltage identification signal 150 according to the specification of the VRM 8.4 voltage identification digital/analogue converter 115, the specification of the VRM 8.5 voltage identification digital/analogue converter 125, the specification of the VRM 9.0 voltage identification digital/analogue converter 215 or the specification of the K7 portable voltage identification digital/analogue converter 225 is selected. Hence, the power controller 300 is able to control a MOSFET switching circuit 140 to output a correct microprocessor core voltage 160 (the VRM 8.4 specification of Intel's Coppermine processor, the VRM 8.5 specification of Intel's Tualatin processor, the VRM 9.0 specification of AMD's K7 desktop processor or the K7 portable specification of K7 portable processor).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power controller for a computer system having a microprocessor therein, wherein the power controller receives a voltage identification signal transmitted from the microprocessor, the power controller comprising:

a first voltage identification digital/analogue converter for receiving the voltage identification signal and outputting a first voltage specification signal;

a second voltage identification digital/analogue converter for receiving the voltage identification signal and outputting a second voltage specification signal; and a selector coupled to the first identification digital/analogue converter and the second identification digital/analogue converter for outputting the voltage specification signal from the first voltage identification digital/analogue converter or the second voltage identification digital/analogue converter based on a microprocessor selection signal generated by the computer signal.

2. The power controller of claim 1, wherein the selector is a multiplexer that couples with the first voltage identification digital/analogue converter and the second voltage identification digital/analogue converter for receiving the microprocessor selection signal and outputting the first voltage specification signal or the second voltage specification signal.

3. The power controller of claim 1, wherein the power controller also produces a terminal voltage according to a microprocessor selection signal.

4. A power controller for a computer system having a microprocessor selected from a panel of processors, wherein the computer system outputs a microprocessor selection signal and a microprocessor type signal according to the particular microprocessor, the power controller comprising:
- a plurality of voltage identification digital/analogue converters for receiving a voltage identification signal from the particular microprocessor and outputting a plurality of voltage identification signals; and
- a selector coupled to the voltage identification digital/analogue converters and outputting one of the voltage identification signals according to the microprocessor selection signal and the microprocessor type signal, wherein each voltage identification digital/analogue converters corresponds with one type of the microprocessor for producing a voltage specification signal that suits the particular processor.

5. The power controller of claim 4, wherein the selector includes a multiplexer coupled to the voltage identification digital/analogue converters for outputting one of the voltage specification signals.

6. The power controller of claim 4, wherein the power controller also provides a terminal voltage for the particular microprocessor according to the microprocessor selection signal and the microprocessor type signal.

7. A computer system capable of supporting a multiple of processor types, comprising:
- a first microprocessor socket for plugging a microprocessor; and
- a power controller coupled to the first microprocessor socket for receiving a voltage identification signal from the microprocessor and a microprocessor selection signal from the computer system so that the computer system can provide a core voltage to the microprocessor, wherein the power controller determines type of microprocessor plugged in the socket according to the microprocessor selection signal, if the microprocessor belongs to a first type of microprocessor, the power controller outputs a first voltage specification signal as well as a first terminal voltage, and if the microprocessor belongs to a second type of microprocessor, the power controller outputs a second voltage specification signal as well as a second terminal voltage.

8. The computer system of claim 7, wherein the power controller further includes:
- a first voltage identification digital/analogue converter for receiving the voltage identification signal and outputting a first voltage specification signal that meets the requirement of the first type microprocessor; and
- a second voltage identification digital/analogue converter for receiving the voltage identification signal and outputting a second voltage specification signal that meets the requirement of the second type microprocessor.

9. The computer system of claim 8, wherein the power controller further includes a multiplexer that couples with the first voltage identification digital/analogue converter and the second voltage identification digital/analogue converter and outputs the first voltage specification signal or the second voltage specification signal.

10. The computer system of claim 7, wherein the system further includes a second microprocessor socket with the microprocessor plugged either into the first microprocessor socket or the second microprocessor socket, the power controller receives a microprocessor type signal from the computer system, the power controller further comprising:
- a third voltage identification digital/analogue converter for receiving the voltage identification signal and outputting a third voltage specification signal that meets requirements for a third type microprocessor; and
- a fourth voltage identification digital/analogue converter for receiving the voltage identification signal and outputting a fourth voltage specification signal that meets requirements for a fourth type microprocessor, wherein the power controller determines type of microprocessor according to the microprocessor selection signal and the microprocessor type signal, if the microprocessor belongs to a third type processor, the power controller outputs the third voltage specification signal as well as a third terminal voltage, and if the microprocessor belongs to a fourth type processor, the power controller outputs the fourth voltage specification signal as well as a fourth terminal voltage.

* * * * *